US012427674B2

United States Patent
Wen et al.

(10) Patent No.: US 12,427,674 B2
(45) Date of Patent: Sep. 30, 2025

(54) TASK-ORIENTED 3D RECONSTRUCTION FOR AUTONOMOUS ROBOTIC OPERATIONS

(71) Applicant: Siemens Aktiengesellschaft, Munich (DE)

(72) Inventors: Chengtao Wen, Redwood City, CA (US); Heiko Claussen, Wayland, MA (US); Xiaowen Yu, Union City, CA (US); Eugen Solowjow, Berkeley, CA (US); Richard Gary McDaniel, Hightstown, NJ (US); Swen Elpelt, Belle Mead, NJ (US); Juan L. Aparicio Ojea, Moraga, CA (US)

(73) Assignee: Siemens Aktiengesellschaft, Munich (DE)

( * ) Notice: Subject to any disclaimer, the term of this patent is extended or adjusted under 35 U.S.C. 154(b) by 310 days.

(21) Appl. No.: 17/995,313

(22) PCT Filed: Apr. 6, 2020

(86) PCT No.: PCT/US2020/026802
§ 371 (c)(1),
(2) Date: Oct. 3, 2022

(87) PCT Pub. No.: WO2021/206671
PCT Pub. Date: Oct. 14, 2021

(65) Prior Publication Data
US 2023/0158679 A1 May 25, 2023

(51) Int. Cl.
*B25J 9/16* (2006.01)
*G06T 17/00* (2006.01)
(52) U.S. Cl.
CPC ............. *B25J 9/1697* (2013.01); *B25J 9/161* (2013.01); *G06T 17/00* (2013.01)

(58) Field of Classification Search
CPC ........ B25J 9/1697; B25J 9/161; B25J 9/1612; B25J 9/1694; B25J 9/1666; B25J 9/16;
(Continued)

(56) References Cited

U.S. PATENT DOCUMENTS 9,987,746 B2 * 6/2018 Bradski .................. B25J 9/1664
10,981,272 B1 * 4/2021 Nagarajan .............. B25J 9/1669
(Continued)

FOREIGN PATENT DOCUMENTS

| CN | 105228712 | 1/2016 |
| CN | 106256512 | 12/2016 |

(Continued)

OTHER PUBLICATIONS

Wang Weiyue et al: "Shape Inpainting Using 3D Generative Adversarial Network and Recurrent Convolutional Networks", 2017 IEEE International Conference on Computer Vision (ICCV), IEEE, Oct. 22, 2017 (Oct. 22, 2017), pp. 2317-2325 / Dec. 22, 2017.
(Continued)

*Primary Examiner* — Adam R Mott
*Assistant Examiner* — Sagar Kc

(57) ABSTRACT

Autonomous operations, such as robotic grasping and manipulation, in unknown or dynamic environments present various technical challenges. For example, three-dimensional (3D) reconstruction of a given object often focuses on the geometry of the object without considering how the 3D model of the object is used in solving or performing a robot operation task. As described herein, in accordance with various embodiments, models are generated of objects and/or physical environments based on tasks that autonomous machines perform with the objects or within the physical environments. Thus, in some cases, a given object or environment may be modeled differently depending on the task that is performed using the model. Further, portions of an
(Continued)

object or environment may be modeled with varying resolutions depending on the task associated with the model.

20 Claims, 8 Drawing Sheets

(58) Field of Classification Search
CPC .......... G06T 17/00; G05B 2219/40053; G05B 2219/40557; G05B 2219/40564; G05B 2219/40613; G05B 2219/45063
See application file for complete search history.

(56) References Cited

U.S. PATENT DOCUMENTS

| | | | | |
|---|---|---|---|---|
| 2004/0017937 | A1* | 1/2004 | Silverstein | B25J 9/1697 382/153 |
| 2016/0084642 | A1* | 3/2016 | Bradski | B25J 9/1612 348/136 |
| 2019/0099891 | A1* | 4/2019 | Tomioka | B25J 9/1697 |
| 2020/0001458 | A1* | 1/2020 | Zhang | B25J 19/023 |
| 2020/0090384 | A1* | 3/2020 | Atria | G06T 11/006 |
| 2021/0005017 | A1* | 1/2021 | Hollenbeck | G06T 7/11 |
| 2021/0023720 | A1* | 1/2021 | Du | G06T 7/194 |
| 2021/0295606 | A1* | 9/2021 | Kim | G06T 17/20 |

FOREIGN PATENT DOCUMENTS

| | | |
|---|---|---|
| CN | 110325327 | 10/2019 |
| CN | 110856934 | 3/2020 |
| JP | 2002209035 | 7/2002 |
| WO | 2020069379 | 4/2020 |

OTHER PUBLICATIONS

Yang Bo et al: 3D Object Reconstruction from a Single Depth View with Adversarial Learning, 2017 IEEE International Conference on Computer Vision Workshops (ICCVW), IEEE, Oct. 22, 2017 (Oct. 22, 2017), pp. 679-688 / Oct. 22, 2017.
International Search Report corresponding to application No. PCT/US2020/026802; 4 pages.

* cited by examiner

TASK-ORIENTED 3D RECONSTRUCTION FOR AUTONOMOUS ROBOTIC OPERATIONS

BACKGROUND

Autonomous operations, such as robotic grasping and manipulation, in unknown or dynamic environments present various technical challenges. Such operations, for example, can have a variety of applications in Industry 4.0. Autonomous operations in dynamic environments may be applied to mass customization (e.g., high-mix, low-volume manufacturing), on-demand flexible manufacturing processes in smart factories, warehouse automation in smart stores, automated deliveries from distribution centers in smart logistics, and the like. In order to perform autonomous operations, such as grasping and manipulation, robots may learn skills through exploring the environment. In particular, for example, robots might interact with different objects under different situations. Often, however, such physical interactions in the real world by robots are time consuming, cost prohibitive, and in some cases, dangerous. Three-dimensional (3D) reconstruction of an object or of an environment can create a digital twin or model of a given environment of a robot, or of a robot or portion of a robot, which can enable a robot to learn skills efficiently and safely.

It is recognized herein, however, that current approaches to reconstruction or modeling lack efficiency and capabilities. Further, in some cases, the performance of autonomous machines in dynamic environments is inhibited by various shortcomings in modeling those environments, in particular objects within those environments.

BRIEF SUMMARY

Embodiments of the invention address and overcome one or more of the described-herein shortcomings or technical problems by providing methods, systems, and apparatuses for modeling objects and physical environments while conserving computational resources, so that autonomous machines can operate in these environments. In various examples, task-oriented 3D construction models are generated based on prior knowledge of autonomous tasks that are performed by an object represented by the models. In doing so, reconstruction models can be generated that have variable resolutions at various portions of the models. Such varying resolutions can conserve, for example, online reconstructions time and memory storage.

In an example aspect, a method for operating an autonomous machine in a physical environment can be performed by an autonomous system. The autonomous system can detect an object within the physical environment. The object can define a plurality of regions. A task that requires that the autonomous machine interact with the object can be identified. The method can further include determining a select region of the plurality of regions of the object that is associated with the task. Based on the task, the autonomous system can capture images of the object. The images can define different views of the object such that the different views of the object are based on the task. A view can be a depth image, RGB image, RGB-D image, IR (thermal infrared) image, or the like. Based on the different views of the object, the autonomous system can generate an object model of the object, wherein the object model defines a greater resolution at the select region as compared to the other regions of the plurality of regions. In some cases, a sensor can be positioned based on the task so as to capture particular images of the object or images of the physical environment. In another aspect, the physical environment can define a plurality of surfaces, and the autonomous system can determine a select surface of the plurality of surfaces that is associated with the task. Furthermore, based on the images of the select surface, the autonomous system can generate an environment model of the physical environment, wherein the environment model defines a greater resolution at the select surface as compared to the other surfaces of the plurality of surfaces. Based on the environment model, the autonomous machine can move the object along a trajectory that avoids the select surface and/or the other surfaces of the physical environment.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

It is recognized herein that current approaches to constructing models of (or reconstructing) objects and environments lack efficiency and capabilities. For example, three-dimensional (3D) reconstruction of a given object often focuses on the geometry of the object without considering how the 3D model of the object is used in solving or performing a robot operation task. As used herein, unless otherwise specified, robots and autonomous machines can be used interchangeably, without limitation. As described herein, in accordance with various embodiments, models are generated of objects and/or physical environments based on tasks that autonomous machines perform with the objects or within the physical environments. Thus, in some cases, a given object or environment may be modeled differently depending on the task that is performed using the model.

Further, portions of an object or environment may be modeled with varying resolutions depending on the task associated with the model.

In some cases, current approaches to reconstruction or modeling lack efficiency and capabilities because prior knowledge of robotic tasks are not fully utilized. By way of example, in order to drive a robot to pick up a coffee mug via its handle, the robot may need to estimate the surface geometry of the handle with high accuracy. Therefore, the reconstruction model of the mug may require a high resolution for the handle, and a low resolution for the other surfaces of the mug. It is also recognized herein that current reconstruction models having unique resolutions are low efficient in terms of online reconstruction and memory footprint. Further, in some cases, the performance of autonomous machines in dynamic environments is inhibited by various shortcomings in modeling those environments, in particular modeling objects within those environments.

Figure 1:
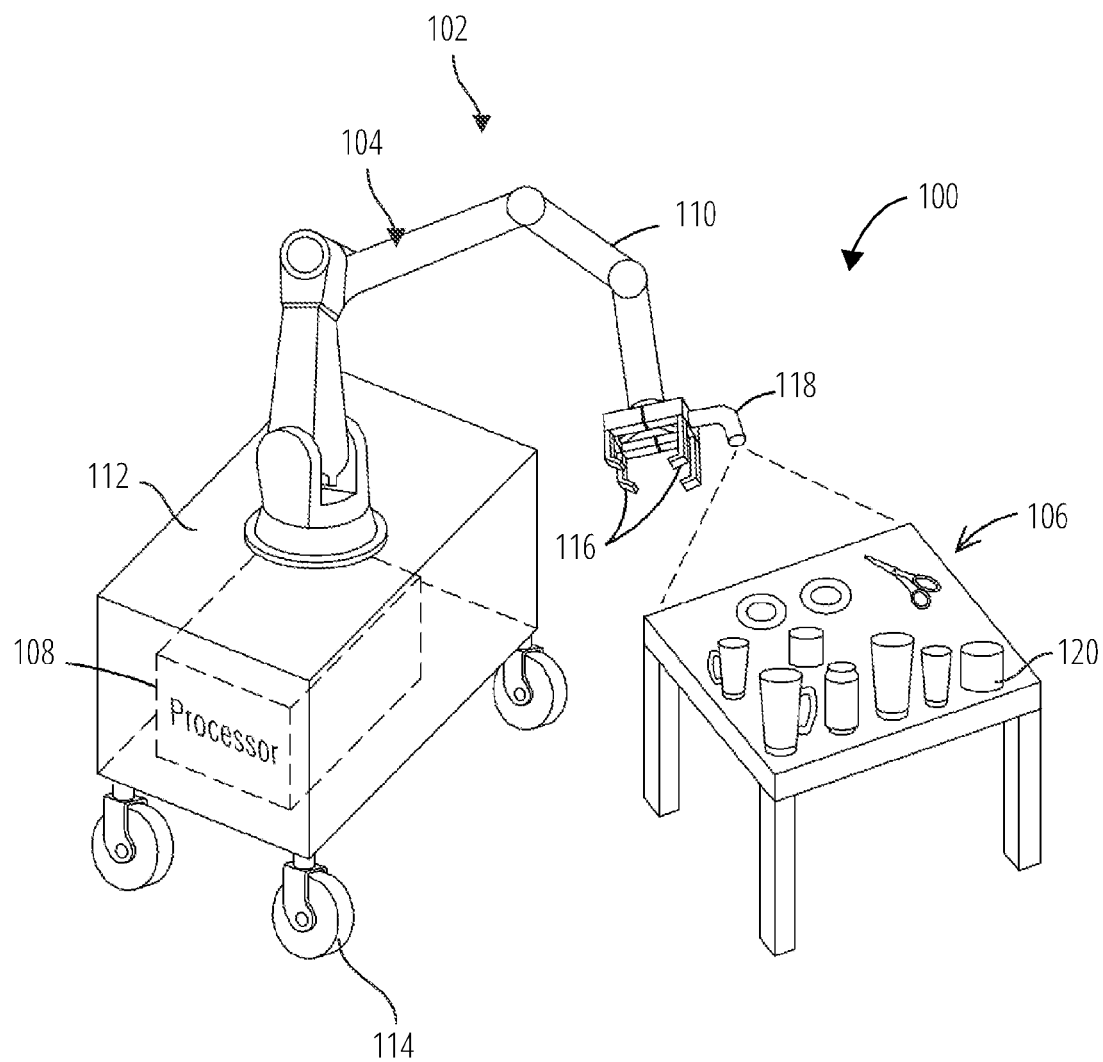
FIG. 1 shows an example autonomous machine in an example physical environment that includes various objects, in accordance with an example embodiment.

Referring now to FIG. 1, an example industrial or physical environment 100 is shown. As used herein, a physical environment can refer to any unknown or dynamic industrial environment. A reconstruction or model may define a virtual representation of the physical environment 100 or one or more objects 106 within the physical environment 100. The physical environment 100 can include a computerized autonomous system 102 configured to perform one or more manufacturing operations, such as assembly, transport, or the like. The autonomous system 102 can include one or more robot devices or autonomous machines, for instance an autonomous machine 104, configured to perform one or more industrial tasks. The system 102 can include one or more computing processors configured to process information and control operations of the system 102, in particular the autonomous machine 104. The autonomous machine 104 can include one or more processors, for instance a processor 108, configured to process information and/or control various operations associated with the autonomous machine 104. An autonomous system for operating an autonomous machine within a physical environment can further include a memory for storing modules. The processors can further be configured to execute the modules so as to process information and generate models based on the information. It will be understood that the illustrated environment 100 and the system 102 are simplified for purposes of example. The environment 100 and the system 102 may vary as desired, and all such systems and environments are contemplated as being within the scope of this disclosure.

Still referring to FIG. 1, the autonomous machine 104 can further include a robotic arm or manipulator 110 and a base 112 configured to support the robotic manipulator 110. The base 112 can include wheels 114 or can otherwise be configured to move within the physical environment 100. The autonomous machine 104 can further include an end effector 116 attached to the robotic manipulator 110. The end effector 116 can include a gripper or one more tools configured to grasp and/or move objects 106. The robotic manipulator 110 can be configured to move so as to change the position of the end effector 116, for example, so as to place or move objects 106 within the physical environment 100. The system 102 can further include one or more cameras or sensors, for instance a three-dimensional (3D) point cloud camera 118, configured to detect or record objects 106 within the physical environment 100. The camera 118 can be mounted to the robotic manipulator 110 or otherwise configured to generate a 3D point cloud of a given scene, for instance the physical environment 100. Alternatively, or additionally, the one or more cameras of the system 102 can include one or more standard two-dimensional (2D) cameras that can record or capture images (e.g., RGB images or depth images) from different viewpoints. Those images can be used to construct 3D images. For example, a 2D camera can be mounted to the robotic manipulator 110 so as to capture images from perspectives along a given trajectory defined by the manipulator 110.

Thus, one or more sensors or cameras of the autonomous system 102, for instance the camera 118, can be configured to detect and capture images of objects within the physical environment 100. Such objects may be known to the autonomous system 102 or unknown to the autonomous system 102. In some examples, the captured images of a given object define different views of the object. As further described herein, the images of a given object can be captured based on a task that requires that the autonomous machine 104 interact with the object. Thus, different views of the object can be captured based on the task. For example, based on the task, a sensor or camera of the autonomous system 102 can by positioned so as to capture images defining particular views of the object or particular views of the physical environment 100.

With continuing reference to FIG. 1, in an example, one or more cameras can be positioned over the autonomous machine 104, or can otherwise be disposed so as to continuously monitor any objects within the environment 100. For example, when an object, for instance one of the objects 106, is disposed or moved within the environment 100, the camera 118 can detect the object. In an example, the processor 108 can determine whether a given object that is detected is recognized by the autonomous system 102, so as to determine whether an object is classified as known or unknown (new). In some examples, a deep neural network is trained on a set of known objects. Based on its training, the deep neural network can calculate a novelty score for a given object when the object is detected within the environment 100. In an example, when the novelty score is larger than a predefined novelty threshold, the object is classified as new. Conversely, in an example, when the novelty score is lower than the predefined threshold, the object is recognized by the autonomous system 102. If the object is recognized, the processor 108 can retrieve a model of the object, for example, to simulate a task that involves the object. In some examples, if the object is not recognized, such that the object can be considered new to the autonomous machine 104, and thus the autonomous system 102, a model of the object can be generated as described herein in accordance with various embodiments. The mesh representation can be added to the simulated environment such that the new object can be simulated. In particular, the new object can be simulated so as to interact with the robot device 104. In some cases, one or more sensors, for instance the camera 118, can scan the object and the processor 108 convert the scan into a mesh representation of the object.

Figure 2:
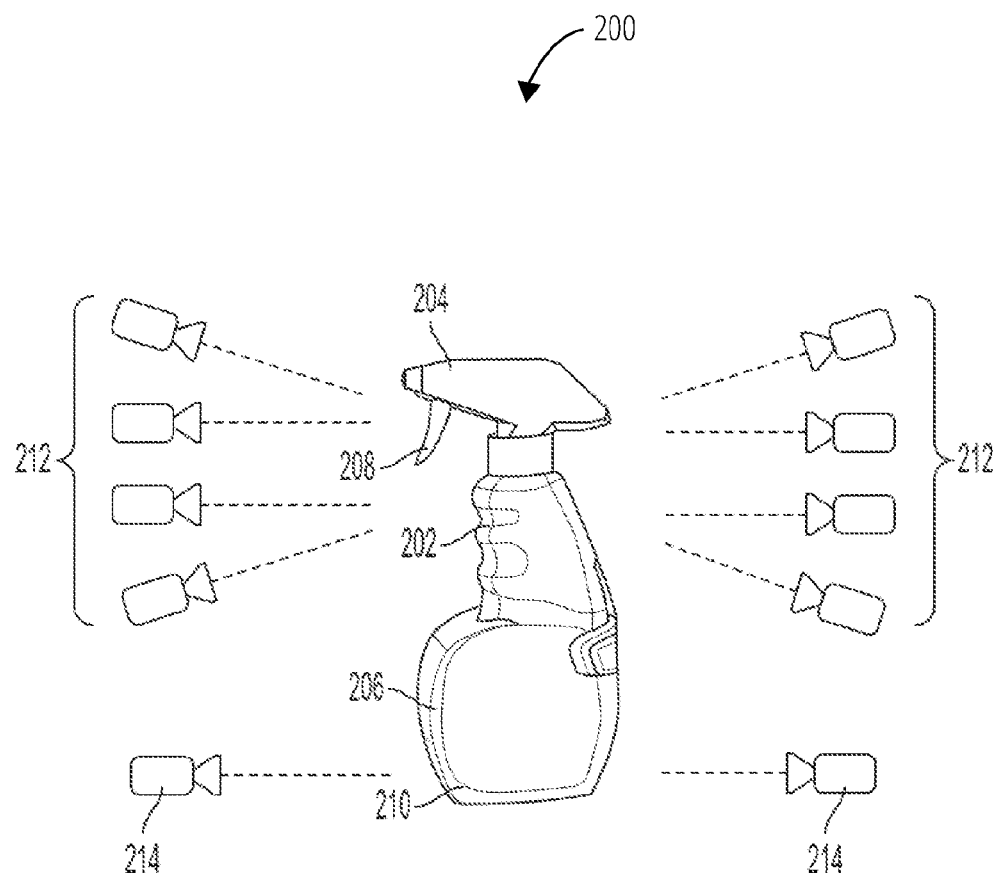
FIG. 2 illustrates an example unknown object and views of the unknown object that can be captured by an autonomous system for a model or reconstruction.

Referring now to FIG. 2, in an example, an object, for instance one of the objects 106, defines an unknown object 200. A 3D reconstruction of objects, for instance the unknown object 200, can be generated in accordance with various embodiments described herein. As used herein, reconstruction and 3D reconstruction can be used interchangeably, without limitation. Further, 3D reconstruction can generally refer to fusing multiple views (e.g., camera views) of a spatially bounded object together so as to construct a 3D geometric model of the object. Example views that can be used in 3D reconstruction include RGB images, depth images, RGB-D images, or the like. It is recognized herein that current approaches to 3D reconstructions are often task-independent in that a given reconstruction may focus on the geometry of the object without considering how the reconstruction will be used, for instance to solve a task performed by a robot.

In accordance with various embodiments, the reconstruction of an object, in particular the views that are captured of the object, are based on a task in which the object is involved. Referring to FIG. 2 to illustrate an example, the unknown object 200 defines a spray bottle 202 that includes a first region or head 204 and a second region or body 206 attached to the head 204. It will be understood that the spray bottle 202 is presented as an example for explanation purposes, though any object that is not recognized by an autonomous system can be the unknown object 200, and all such objects are contemplated as being within the scope of this disclosure. The head 204 includes a handle 208 configured to be pressed so as to spray contents of the bottle 202. The head 204 further defines an irregular or complex geometry that includes the handle 208. The body 206 defines a flat surface 210. Thus, the body 206 defines a simpler geometry than the geometry defined by the head 204. Consequently, it is recognized herein that in current approaches to reconstruction, there may be more camera views 212 that capture the head 204 than camera views 214 that capture the body 206. For example, capturing a number of views 212 of the complex geometry, capturing a number of views 214 of the simple geometry that is less than the number of views 212 of the complex geometry, may allow the bottle 202 to be reconstructed with a consistent accuracy. That is, the head 204 may be modeled at substantially the same resolution as the body 206 even though the head 204 defines a complex geometry.

In accordance with various embodiments, however, the views that are captured of the unknown object 200 are based on the task that is performed with the unknown object 200. Thus, the model or reconstruction of the unknown object 200 can be based on the task for which the model or reconstruction is generated. Referring again to FIG. 2, if an autonomous system, for instance the autonomous system 102, receives a task that requires that the autonomous machine 104 grasp the spray bottle 202, the autonomous machine 104 may determine that the body 206 of the bottle 202 is the region that includes a grasping position for the autonomous machine 104. Thus, the autonomous system 102 can determine a select region, for instance the body 206, of the plurality of regions of the object 200 that is associated with a given task, for instance grasping. The autonomous system 102 can also capture images defining different views of the object that are based on the task, and generate a model of the object that defines a greater resolution at the select region as compared to the other regions. Thus, in the example, based on a grasping task, the autonomous system 102 can generate a model or reconstruction of the spray bottle 202 that defines a greater resolution at the body region as compared to the other regions, for instance the head region.

As described above, tasks, for instance robot manipulation tasks, can impose unique requirements for 3D reconstruction of a given object. By way of another example, one of the objects 106 in the physical environment 100, for instance an unknown or novel object with respect to the autonomous system 102, can define a knife that has a handle and a blade extending along a length defined by the handle. The views of the knife that the autonomous system 102 generates can depend on the task that the autonomous machine will perform with the knife. For example, if the autonomous system 102 receives a task that requires that the autonomous machine 104 use the knife to cut an object, the autonomous system 102 can select the region that includes the handle so as to capture more views of the handle than the blade. Thus, the autonomous system 102 can generate an accurate model of the handle that has a higher resolution of the handle than the model has of the blade. Using this model, the autonomous machine 104 may have access to the detail necessary for handling the blade. Alternatively, for example, if the autonomous system 102 receives a task that requires that the autonomous machine 104 pass the knife, for instance to a human such that the human can grab the handle, the autonomous system 102 can select the region that includes the blade so as to capture more views of the blade than the handle. Thus, the autonomous system 102 can generate an accurate model of the blade that has a higher resolution of the blade than the model has of the handle.

It is recognized herein that reconstructing objects without properly considering tasks or operations associated with the reconstructions may be less efficient than reconstructing objects based on tasks. In some cases, reconstructing objects without basing the reconstructions on tasks or operations associated with the reconstructions may result in operational failure, for instance if the resultant models do meet requirements of subsequent operation tasks. In accordance with various embodiments, however, models are generated based on operational tasks such that, for example, industrial robots can autonomously manipulate novel objects based on the generated models, and without pre-existing CAD models. Further, in some cases, models are generated based on operational tasks such that, for example, industrial robots can autonomously manipulate novel objects under dynamic environmental conditions without accurate environment models. Such reconstruction models can have comparatively low computational complexity and memory requirements. For example, in some cases, by generating models based on tasks, regions of a particular object that are not salient to the task can be estimated or otherwise modeled with limited granularity, such that computational resources can be conserved and/or reserved for modeling the region that is salient to the task. In some examples, such resource conservation may enable resources to be used for real-time embedded 3D surface generation on edge devices (e.g., PLCs) (Programming Logic Control) or industrial robot controllers. Further, in various embodiments, modeling objects and robotic operations associated with the objects are integrated, such that cost and time are reduced for algorithm implementation, tuning, and commissioning, thereby generating technical solutions more quickly as compared to current modeling approaches.

Figure 3:
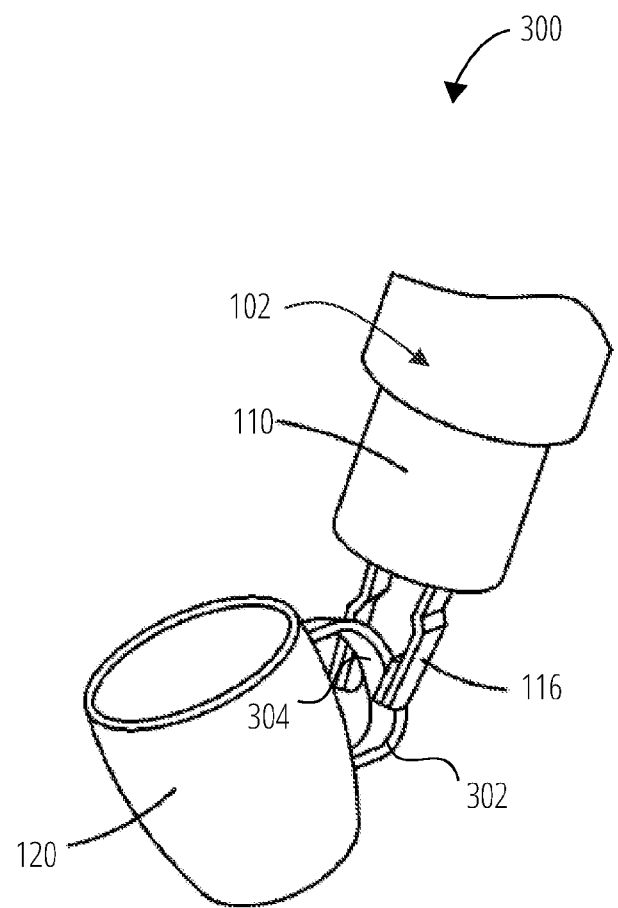
FIG. 3 shows an example operation that can be performed using a task-based reconstruction of an object.

Referring also to FIG. 3, an example 3D reconstruction problem includes reconstructing a 3D geometric structure of one of the spatially bounded objects 106, for instance a mug 120, so that an operation 300 can be performed using the reconstruction. The example operation 300 includes grasping the mug 120 and tilting the mug 120 so as to pour liquid out of the mug 120, though it will be understood that other manipulations may be performed on the mug 120 as desired, and all such manipulations on the mug 120 or other objects are contemplated as being within the scope of this disclosure. To generate a model or reconstruction of the mug 120, various views of the mug 120 can be captured. In various examples, an RGB image, depth image, or RGB-D can define one or more views of the mug 120. In some cases, the autonomous system 102 can perform active perception so as to select subsequent views based on previous views. In particular, views of the mug 120 can be used to generate a partial reconstruction of the mug 120, subsequent views can be selected based on the partial reconstruction. Such active perception can reduce the number of views that are captured as compared to passive perception. In a passive perception example, camera views may be sampled evenly in space, or randomly, such that a given object is reconstructed without regard for its features.

Referring in particular to FIG. 3, the mug 120 includes a handle 302. In an example, the autonomous system 102 receives a task that requires that the mug 120 is grasped by the end effector 116. The task may further require that the autonomous machine 104 tilt the mug 120 so as to pour contents within the mug 120 at a specific location. Based on the task, camera poses of the mug 120 are sampled. For example, based on the grasping and manipulation task, views of the handle 302 can be captured. In particular, views of a portion 304 of the handle 302 can be captured. In some cases, more views of the portion 304 are captured than other portions of the mug, for instance other portions of handle 302. In an example, the autonomous system 102 can perform active perception so as to collect more views of the portion 304 than other portions of the mug 120 and other portions of the environment in which the mug 120 resides. The portion 304 of the handle 302 can define candidate locations for the end effector 116 to grasp the mug 120 to perform the received task. Thus, without being bound by theory, the autonomous system 102 can automatically collect task-relevant views, so as to reduce computation time involved in selecting locations for grasping to perform the task. Further, reconstruction of an object can be simplified by focusing on a comparatively small portion of the object that is related to one or more tasks, for instance grasping and a manipulation task that is performed subsequent to the grasping.

Figure 4:
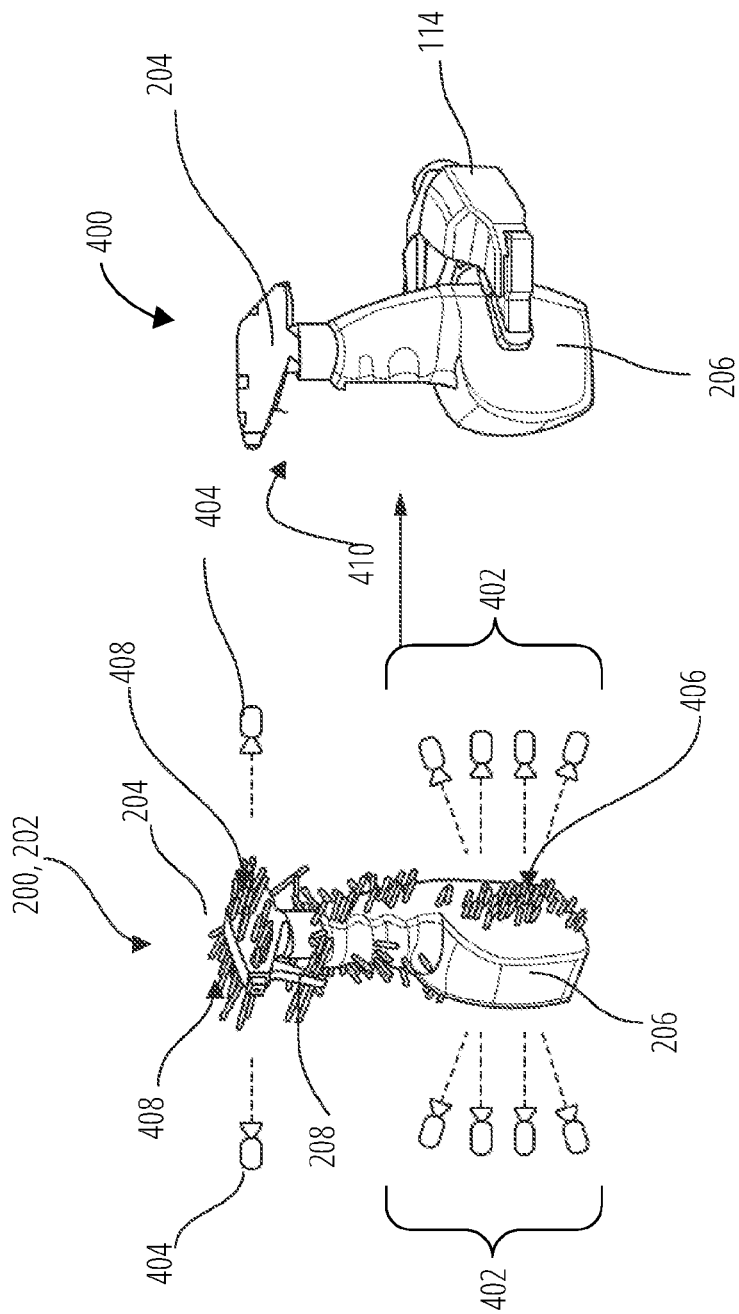
FIG. 4 illustrates an example reconstruction of the unknown object shown in FIG. 2, wherein the reconstruction is generated using views that are captured based on a grasping task.

Referring now to FIG. 4, an example object model 400 of the unknown object 200 is shown. The object model 400 is based on a grasping task, for instance a pick and place operation, that will be performed by a robot, for instance the autonomous machine 104. In some cases, multiple views of the unknown object 200 are captured to detect and identify the object as a spray bottle. In an example, after the unknown object 200 is identified as a spray bottle, CAD models of spray bottles may be retrieved to determine potential contact points for grasping. Based on, or responsive to, receiving the task, views 402 of the body 206 can be captured. In some cases, views 404 can also be captured. In various examples, based on the task performed on the bottle 202, more camera views 402 are collected of the body 206 than camera views 404 of the head 204. Based on the views 402, stable grasp points 406 can be calculated. The autonomous system 102 can determine that grasp points 406 qualify as stable grasp points based on various grasp quality metrics such as, for example, force closure, form closure, cage, etc. Similarly, grasp points 408 can be calculated, and can be determined to be low-quality grasp points. To select grasp points, in an example, a neural network, for instance a grasp quality convolutional neural network (GQ-CNN), can be trained, such that the GQ-CNN can predict the probability of success of candidate grasp locations of a object, using point clouds collected by 3D cameras. The GQ-CNN can generate or determine high quality grasp points, for example, based on the object's surface geometry information.

Using the views 404 and 406, which are based on a grasping and manipulation task that needs to be performed on the unknown object 200, the object model 400 can be generated, such that the object model 400 can define a greater resolution at a select region, for instance the body 206, as compared to the other regions, for instance the head 204, of the object 200. Thus, in accordance with the example, area of the body 206 is reconstructed more accurately as compared to the head 204. In some cases, regions of an object that are not associated with the task can be reconstructed with a low accuracy as compared to a region of the object that is selected as being associated with the task. For example, the object model 400 can define a low accuracy at the head 204. In particular, by way of example, portions of the handle 208 can be omitted from the reconstruction because the handle 208 is not involved in a particular task, for instance a pick and place operation. It is recognized herein that differences in resolution, for instance reconstructions defining low accuracy at portions of an object that are not involved in task for which the reconstruction is generated, can expedite processing and conserve, or save, computational resources.

In some cases, in accordance with various example embodiments and with continuing reference to FIG. 4, an extension can be used to refine the accuracy of a 3D reconstructed model, for instance the object model 400, at regions that are not selected as being associated with a given task. For example, the accuracy of the object model 400 at the region that includes the head 204, and thus the handle 208, can be refined. As described, regions of the unknown object 200 that are not required to be reconstructed based on a given task may be modeled based on limited images or views as compared to a region of the unknown object 200 that is selected as being associated with the task. Consequently, those regions that are not associated with the task may lack detail or, in some cases, may be missing. By way of example, the model 400 at the region of the handle 208 that is not associated with a grasping and manipulation task may lack detail or may define a missing portion 410. In some examples, the autonomous system 102 can estimate the missing portion 410 or estimate detail of a region of an object that is not associated with a given task.

In some examples, the autonomous system 102 includes a neural network, for instance a Generative Adversarial Neural Networks (GAN), configured to learn and predict objects associated with industrial environments. It will be understood that the GAN is presented as an example, and that various neural networks can be used as desired, and all such neural networks are contemplated as being within the scope of this disclosure. For example, the GAN can be trained with 3D models of objects, for instance thousands or millions of 3D models of objects. Based on the training, the GAN can be triggered to estimate a portion of an unknown object, for instance the missing portion 410 of the unknown object 200. In various examples, the estimated portion is in performing the grasping task as compared to the area of the body 206. The GAN can be triggered as desired. In some cases, the GAN can be triggered when there is limited sensor data of a particular region of an object. For example, referring to FIG. 4, if the autonomous system 102 determines that the views 404 of the head 204 are below a predetermined threshold, the GAN might be triggered to estimate or add detail to portions of the head 204. Alternatively, or additionally, the autonomous system 102 can detect that one or more views of the unknown object 200 are missing, in particular the autonomous system 102 can detect the missing portion 410. Such a detection can trigger the GAN to estimate the missing portion 410. Without being bound by theory, the GAN model of the missing portion 410 can significantly expedite the 3D reconstruction process because, as one example, it can reduce the number of views that are taken and processed. Reducing the number of views taken can result in 3D cameras having to physically move less to different positions.

Still referring to FIG. 4, the GAN can estimate the missing portion 410 so as to fill in gaps of the object model 400 using its trained experience. For example, the GAN may be trained on various spray bottles having various designs from various manufacturers. Based on the training, the GAN may detect that the unknown object 200 is a spray bottle even if the spray bottle 202 has not been an input to the GAN. Further, the GAN can construct a handle for the object model 400 so as to estimate the missing portion 410. In some cases, the GAN, based on its training with other spray bottles for example, may use the size of the bottle 202 to estimate the handle 208, such that a mesh model of the handle 208 is proportional to the size and design of the spray bottle 202. In some examples, the autonomous system 102 can include a memory having various parts of objects stored thereon, and the parts may include various handles. In some examples, the estimate mesh model might not represent the ground truth of the handle 208 exactly. It is recognized herein, however, that the estimated model of the missing portion 410 can define collision surfaces of the unknown object 200. Such collision surfaces, even if not exactly representative of the collision surfaces of the spray bottle 202, can aid in simulations or modeling of the grasping and manipulation task performed on the spray bottle 202. For example, based on the estimated collision surfaces, the autonomous system 102 can make determinations regarding when the autonomous machine 104 might collide with the handle 208. In particular, the autonomous system 102 can determine, based on the estimated collision surfaces of the handle 208, how to prevent the autonomous machine 104 from colliding with the handle 208 when the autonomous machine 104 approaches its desired grasp position. Further, the autonomous system 102 can determine, based on the estimated collision surfaces of the handle 208, how to prevent the handle 208 from colliding with other objects when transferring the bottle 202 to another location.

Additionally, or alternatively, the GAN can be used to determine when views, for instance more views, are required of a given object or environment or of a specific region of a given object or environment. By way of example, referring to FIG. 2, the autonomous system 102 can capture a first set of images defining a plurality of views of one of the objects 106. Based on those views, in some cases, the autonomous machine 104 can generate a reconstruction of the object that is based on a task the autonomous machine 104 will perform on the object. Alternatively, the GAN may determine that at least a portion of the object is not estimate to sufficient detail based on the first set of views. In such a case, and responsive to such a determination, the autonomous system 102 can capture a second set of views so that the reconstruction can be refined. It is recognized herein that the GAN directing the capture of views in this manner can conserve computational resources, as compared to traditional 3D reconstructions that require additional data from sensors, which are in general time consuming and error prone with large sensor noises.

Figure 5:
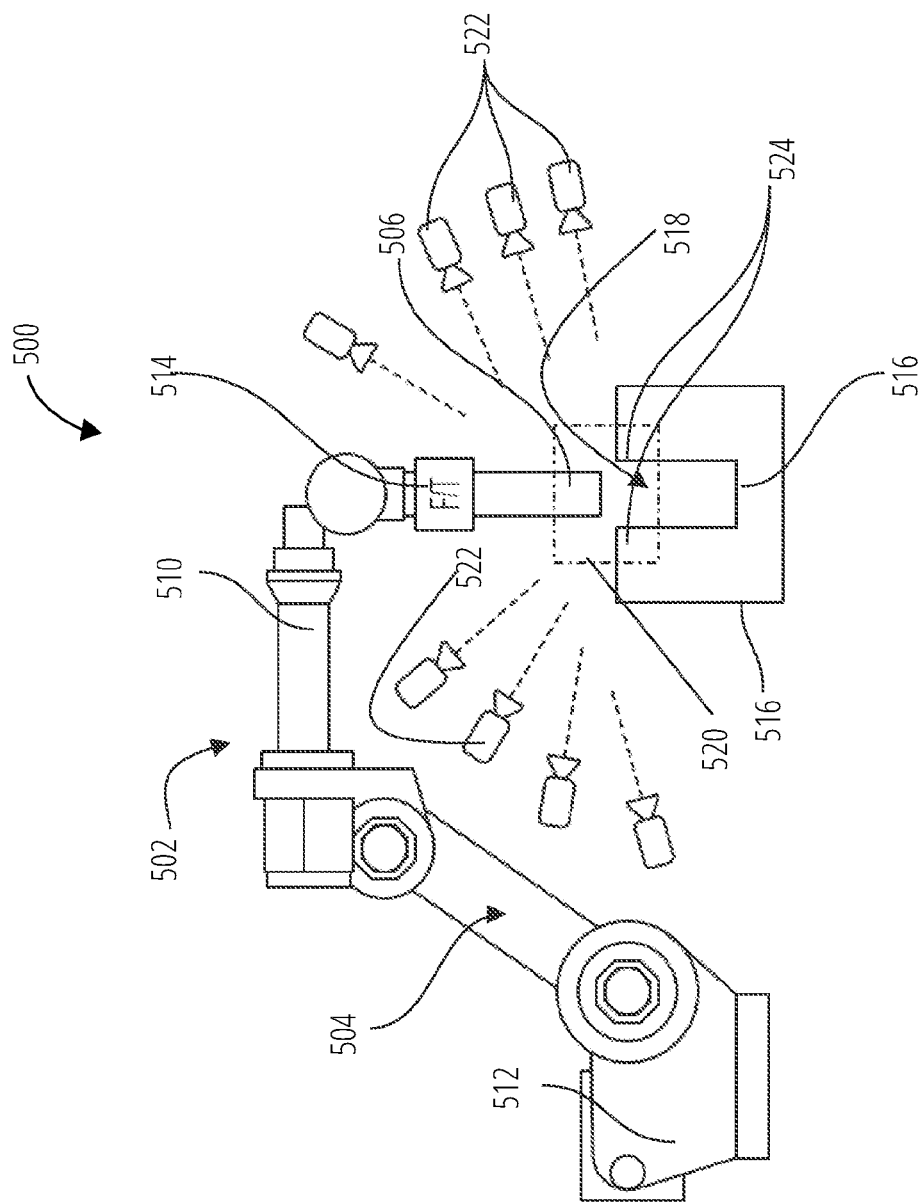
FIG. 5 illustrates another example autonomous machine in another example physical environment, in accordance with another example embodiment.

Referring now to FIG. 5, another example industrial or physical environment 500 is shown. A reconstruction or model may define a virtual representation of the physical environment 500 or one or more objects, for instance an object 506, within the physical environment 500. The physical environment 500 can include a computerized autonomous system 502 configured to perform one or more manufacturing operations, such as assembly, transport, or the like. The autonomous system 502 can include one or more robot devices or autonomous machines, for instance an autonomous machine 504, configured to perform one or more industrial tasks. The system 502 can include one or more memories and computing processors configured to process information and control operations of the system 502, in particular the autonomous machine 504. The autonomous machine 504 can include one or more memories and processors configured to process information and/or control various operations associated with the autonomous machine 504. An autonomous system for operating an autonomous machine within a physical environment can further include a memory for storing modules. The processors can further be configured to execute the modules so as to process information and generate models based on the information. It will be understood that the illustrated environment 500 and the system 502 are simplified for purposes of example. The environment 500 and the system 502 may vary as desired, and all such systems and environments are contemplated as being within the scope of this disclosure.

Still referring to FIG. 5, the autonomous machine 504 can further include a robotic arm or manipulator 510 and a base 512 configured to support the robotic manipulator 510. The base 512 can include or can otherwise be configured to move within the physical environment 500. Alternatively, or additionally, the robotic manipulator 510 can be configured to move within the physical environment 500. The autonomous machine 504 can further include an end effector 514 attached to the robotic manipulator 510. The end effector 514 can include a gripper or one more tools configured to grasp and/or move objects 506. The robotic manipulator 510 can be configured to move so as to change the position of the end effector 514, for example, so as to place or move the object 506 within the physical environment 500. The autonomous system 502 can further include one or more cameras or sensors, for instance three-dimensional (3D) point cloud cameras that are configured to detect or record objects within the physical environment 100, and thus the physical environment 500 itself. Alternatively, or additionally, the one or more cameras of the system 502 can include one or more standard two-dimensional (2D) cameras that can record or capture images (e.g., RGB images or depth images) from different viewpoints.

In some examples, the autonomous system 502 can perform task-oriented perception and modeling so as to avoid collisions during tasks. By way of example, the physical environment 500 can define a plurality of surfaces 516 that define a hole 518. The object 506 can define a peg or other object sized so as to be inserted into the hold 518. Continuing with the example, the autonomous system 502 can receive a task that requires that that the autonomous machine 504 inserts the object 506 into the hole 518. It will be understood that the peg-in-hole task is a simplified assembly task for purposes of example, such that other assembly or transport tasks can be performed as desired in accordance with various embodiments, and all such tasks are contemplated as being within the scope of this disclosure. Based on the task, the autonomous system 502 can select a portion 520 of the physical environment 500 in which to capture camera views 522, wherein the task requires that the autonomous machine 504 interact with the portion 520. In some cases, more camera views 522 are captured of the selected portion 520 than views that are captured of other portions, which can be considered task-irrelevant portions, of the physical environment 500. In particular, the autonomous system 502 can determine, based on the task, that collisions between the object 506 and the surfaces 516 of the physical environment 500 are most likely to occur at the portion 520 that includes a lower end 522 of the object 506 and an upper region of the hole 518. The upper region of the hole, and thus the portion 520 of the physical environment 500, can include one or more select surfaces 524. Thus, the autonomous system 502 can determine that the select surface 524 of the plurality of surfaces is associated with the task.

In some examples, based on the captured images of the select one or more surfaces 524, and the autonomous system can generate an environment model of the physical environment, wherein the environment model defines a greater resolution at the select surface 524 as compared to the other surfaces of the plurality of surfaces 516. Thus, based on a task that requires that the autonomous machine 504 insert the object 506 into the hole 518, the environmental model can define a greater resolution at the upper region of the hole 518 than other regions of the hole or physical environment 500. Further, based on the captured images of the portion 520 that includes the lower end 522 of the object 506, the autonomous system 502 can generate a model of the object 506 that defines a greater resolution at the lower end 522 as compared to the other regions of the object 506. Based on the environment model and/or a model of the object 506, the autonomous machine can move the object 506 along a trajectory that avoids the select surface and/or the other surfaces of the physical environment.

Thus, in some cases, based on the task, mesh models can be generated of a small portion of the robot and the environment in which the robot operates. Such task-oriented modeling can result in a comparatively fast reconstruction process that involves comparatively low computational complexity.

Figure 6:
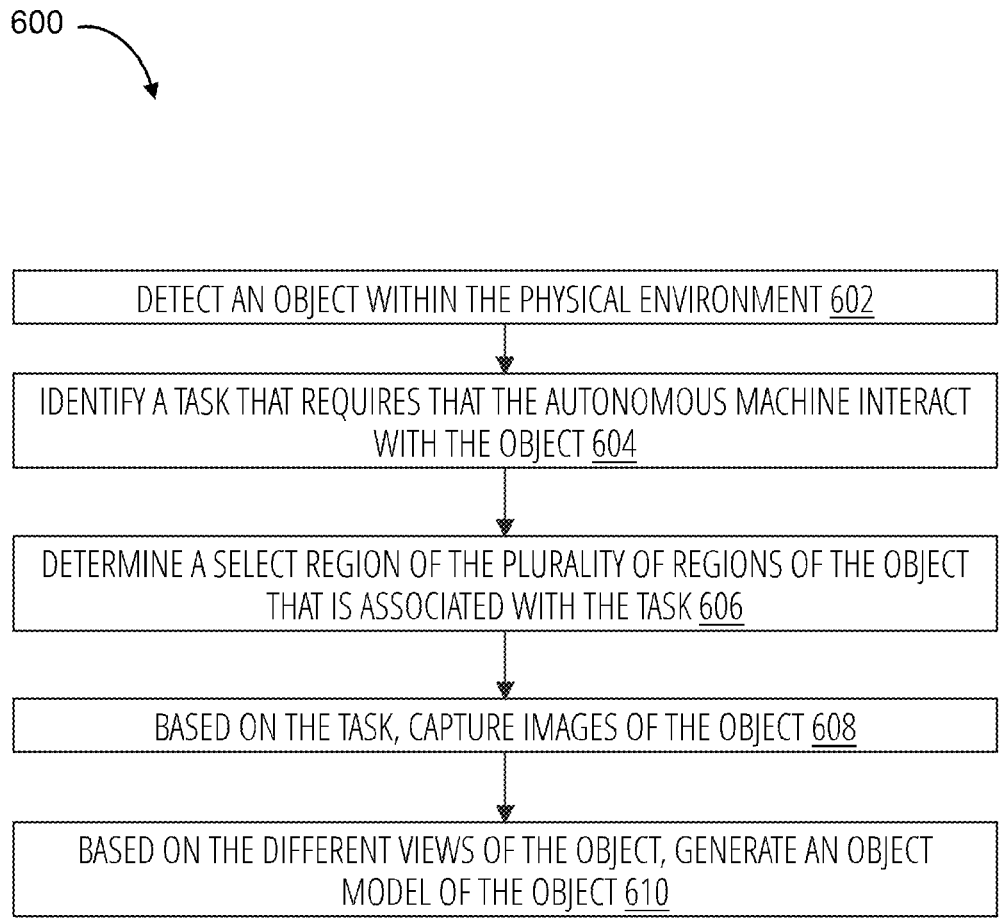
FIG. 6 is a flow diagram that illustrates an example operation that can be performed by an autonomous system in accordance with an example embodiment.

Referring now to FIG. 6, an example reconstruction operation 600 can performed by an autonomous system, for instance the autonomous system 102 or the autonomous system 502, in accordance with various embodiments. At 602, an object is detected within a physical environment. In some cases, the system determines that the object is new or determines that that there are no previously generated models of the object. The object can define a plurality of regions. At 604, the system identifies a task that requires that an autonomous machine interact with the object. For example, the system can receive a task from a processor or operator, or can otherwise determine that the task needs to be performed. At 606, the system determines a select region of the plurality of regions of the object that is associated with the task. For example, if the task involves grasping and manipulating the object, the system can determine the region of the object that the autonomous machine can grasp without dropping the object, while also performing the manipulation aspect of the task. At 608, based on the task, the system captures images of the object. The images can define different views of the object such that the different views of the object are based on the task. At 610, based on the different views of the object, the system generates an object model of the object. In some cases, the system can also generate regions of the object model by using a neural network, for instance a GAN. The object model can define or have a greater resolution at the select region as compared to the other regions of the plurality of regions.

Figure 7:
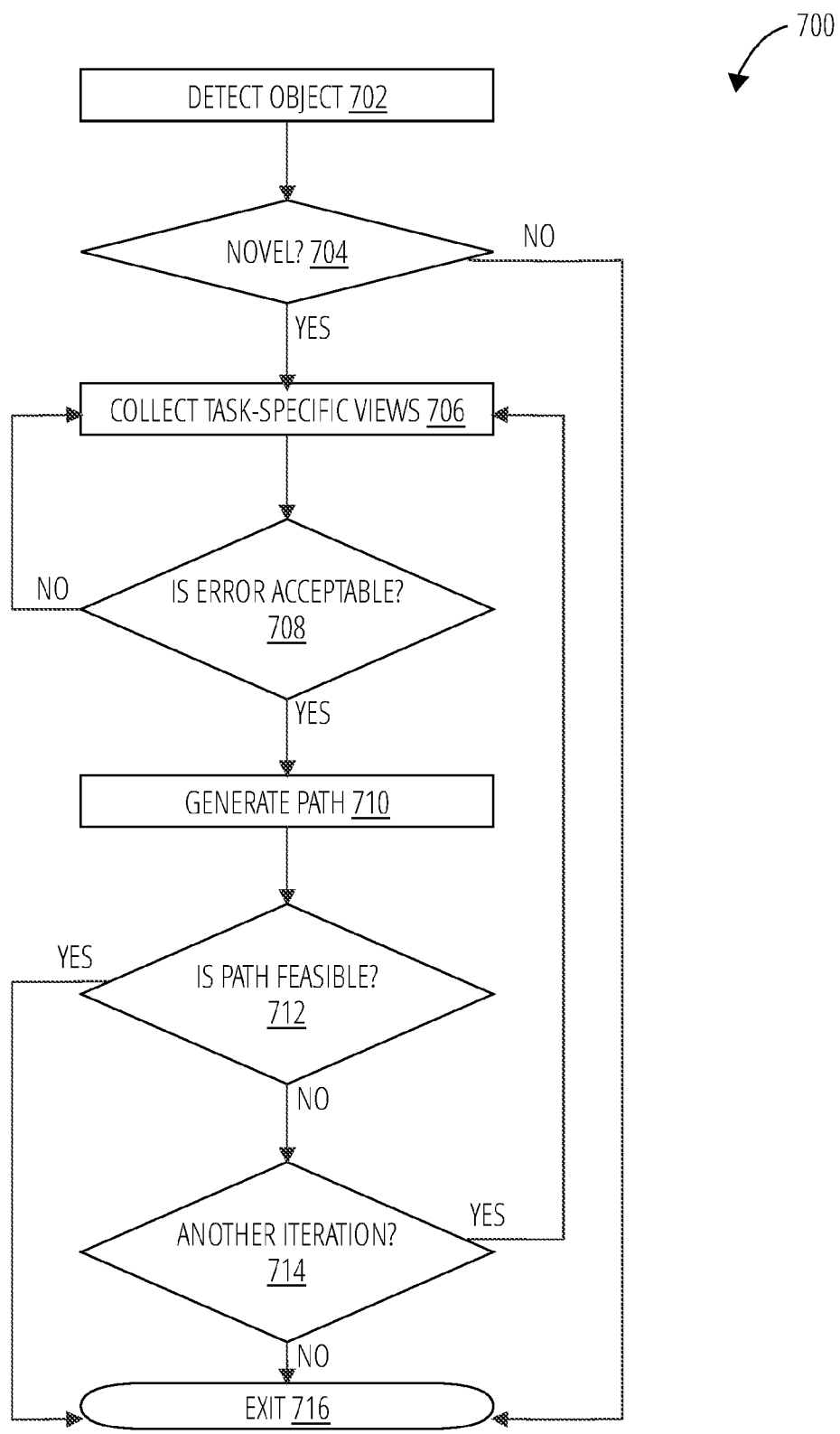
FIG. 7 is another flow diagram that illustrates an example operation that can be performed by an autonomous system in accordance with another example embodiment.

Referring now to FIG. 7, an example modeling and collision avoidance operation 700 can be performed by an autonomous system, for instance the autonomous system 102 or the autonomous system 502, in accordance with various embodiments. At 702, an object is detected within the physical environment of the system. For example, the autonomous system can perform an object detection algorithm. In particular, for example, the system can compare image pixel values across an image to detect an object, as the values at the object are significantly different from the values at areas of the image without the object. At 704, the system determines whether the detected object is novel. In some cases, the system can perform a rough 3D surface reconstruction algorithm to detect if there is a novel object in the physical environment or work area. For example, a detector in the system can randomly sample a small set of camera poses to collect multiple camera views of the object so as to determine whether the object is new to the system. In particular, for example, a deep neural network can be trained on a set of known objects. Based on its training, the deep neural network can calculate a novelty score for a given object when the object is detected within the environment (at 702). In an example, when the novelty score is larger than a predefined novelty threshold, the object is classified as new. Conversely, in an example, when the novelty score is lower than the predefined threshold, the object is recognized by the autonomous system. A view can be a depth image, RGB image, RGB-D image, IR (thermal infrared) image, or the like. If the system determines that the object is not novel, the operation can proceed to 716, where a model of the detected object is retrieved from memory or otherwise obtained. If the system determines that the detected object is novel, the operation can proceed to 706. At 706, the system collects views, based on a task, of the object and/or the environment, so as to collect task-specific views. The task can require that a robot of the system interacts with the object within the environment. Thus, at 706, the system can collect views of portions of the object or environment that are salient to the task. At 708, the system can determine whether the object or environment, in particular the portions of the object or environment that are salient to the task, can be modeled at an acceptable resolution or granularity. In some cases, the model can be compared to a predetermined margin of reconstruction error or accuracy (at 708) to determine whether the error, and thus the model or portions of the model, is acceptable. If the system determines that the error or granularity is below a predetermined threshold, the process can return to 706, where more task-specific views can be captured or collected. If the system determines that the error or granularity is acceptable as compared to the predetermined threshold, the process can proceed to 710.

Still referring to FIG. 7, at 710, based on the task, a path can be generated. The path can define a trajectory within the physical environment that the robot and/or object travel so as to complete the task. In some cases, the physical environment is reconstructed based on views that are collected of the physical environment, so as to generate an environment model. Based on the environment model, at 712, the system can determine whether the generated path is feasible. In some examples, the system performs collision-oriented reconstruction. For example, the system can include a high-fidelity robotics simulator on physics engines to simulate path planning and collision avoidance tasks. If the system determines that the path is not feasible, for example if the system determines that operation along the path will result in a collision between the object and/or the robot and another object within the physical environment, the process may proceed to 714. In some cases, paths that are simulated as infeasible can be fed back into the active perception step (at 706) to inform the views that are collected, and thus the collision-dependent 3D surface models. At 714, the system determines whether it has timed out, or whether it can perform another iteration. For example, in some cases, a number of maximum iterations may be predefined. If the system determines that another iteration can be performed, the process can return to 706, where more task-specific views of the object or environment can be collected so as to generate different 3D reconstructions. At 712, if the system determines that the generated path is feasible, the process can proceed to 716, where an exit flag can be registered as a successful reconstruction. Thus, one or more models can be generated and output at 716. Paths that are simulated as feasible can be correlated to the real world. Similarly, at 714, if the system determines that another iteration cannot be performed, the process can proceed to 716, where an exit flag can be registered that indicates that a maximum number of iterations is reached. In some cases, the number of iterations can be increased, such that the process can return to 706. At 716, in some examples, models that are output can include a reconstruction of the object and a reconstruction of the physical environment. The models can further include a constructed path that defines a trajectory such that the task can be performed without collisions.

Without being bound by theory, in accordance with various embodiments, unknown objects and robotic operations can be modeled for mass customization in manufacturing and warehouse automation to ensure high level productivity and flexibility. As described herein, by automatically integrating 3D reconstructions into robotic operation task pipelines, novel parts can be manufactured without, for example, knowledge of precise locations, specifications, CAD information, and/or the like. Further, embodiments described herein can reduce cost and time associated with human engineering efforts in, for example, implementing, tuning, and commissioning reconstructions. For example, as described herein, time consuming high-accuracy reconstruction processes can be limited to surface areas or portions that directly and significantly impact specific robot operation tasks. The resulting reconstruction models can have low computational complexity and memory requirements. Thus, in some cases, real-time embedded 3D reconstructions can run on edge devices (e.g., PLCs and industrial robot controllers).

Figure 8:
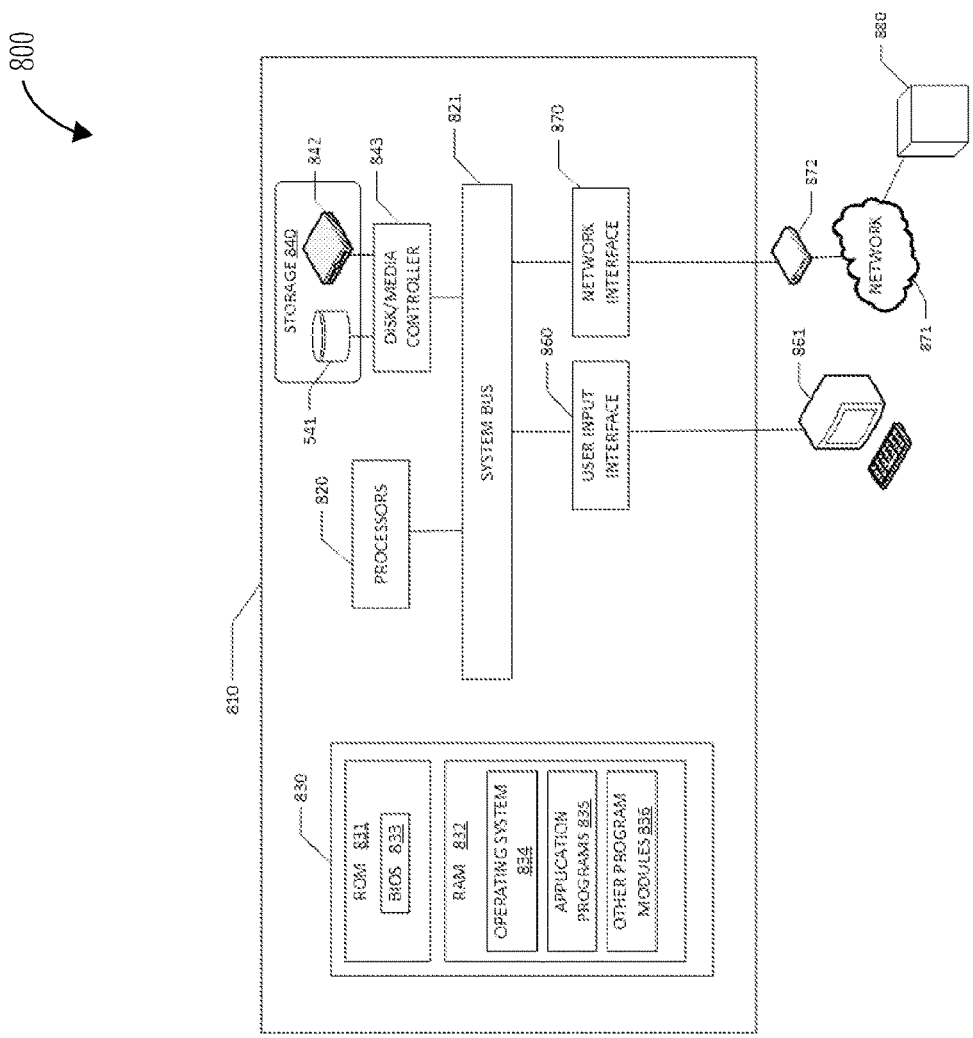
FIG. 8 illustrates a computing environment within which embodiments of the disclosure may be implemented.

FIG. 8 illustrates an example of a computing environment within which embodiments of the present disclosure may be implemented. A computing environment 800 includes a computer system 810 that may include a communication mechanism such as a system bus 821 or other communication mechanism for communicating information within the computer system 810. The computer system 810 further includes one or more processors 820 coupled with the system bus 821 for processing the information. The autonomous systems 102 and 502 may include, or be coupled to, the one or more processors 820.

The processors 820 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 820 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 821 may include at least one of a system bus, a memory bus, an address bus, or a message bus, and may permit exchange of information (e.g., data (including computer-executable code), signaling, etc.) between various components of the computer system 810. The system bus 821 may include, without limitation, a memory bus or a memory controller, a peripheral bus, an accelerated graphics port, and so forth. The system bus 821 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 8, the computer system 810 may also include a system memory 830 coupled to the system bus 821 for storing information and instructions to be executed by processors 820. The system memory 830 may include computer readable storage media in the form of volatile and/or nonvolatile memory, such as read only memory (ROM) 831 and/or random access memory (RAM) 832. The RAM 832 may include other dynamic storage device(s) (e.g., dynamic RAM, static RAM, and synchronous DRAM). The ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system 833 (BIOS) containing the basic routines that help to transfer information between elements within computer system 810, such as during start-up, may be stored in the ROM 831. RAM 832 may contain data and/or program modules that are immediately accessible to and/or presently being operated on by the processors 820. System memory 830 may additionally include, for example, operating system 834, application programs 835, and other program modules 836. Application programs 835 may also include a user portal for development of the application program, allowing input parameters to be entered and modified as necessary.

The operating system 834 may be loaded into the memory 830 and may provide an interface between other application software executing on the computer system 810 and hardware resources of the computer system 810. More specifically, the operating system 834 may include a set of computer-executable instructions for managing hardware resources of the computer system 810 and for providing common services to other application programs (e.g., managing memory allocation among various application programs). In certain example embodiments, the operating system 834 may control execution of one or more of the program modules depicted as being stored in the data storage 840. The operating system 834 may include any operating system now known or which may be developed in the future including, but not limited to, any server operating system, any mainframe operating system, or any other proprietary or non-proprietary operating system.

The computer system 810 may also include a disk/media controller 843 coupled to the system bus 821 to control one or more storage devices for storing information and instructions, such as a magnetic hard disk 841 and/or a removable media drive 842 (e.g., floppy disk drive, compact disc drive, tape drive, flash drive, and/or solid state drive). Storage devices 840 may be added to the computer system 810 using an appropriate device interface (e.g., a small computer system interface (SCSI), integrated device electronics (IDE), Universal Serial Bus (USB), or FireWire). Storage devices 841, 842 may be external to the computer system 810.

The computer system 810 may also include a field device interface 865 coupled to the system bus 821 to control a field device 866, such as a device used in a production line. The computer system 810 may include a user input interface or GUI 861, which may comprise one or more input devices, such as a keyboard, touchscreen, tablet and/or a pointing device, for interacting with a computer user and providing information to the processors 820.

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium of storage 840, such as the magnetic hard disk 841 or the removable media drive 842. The magnetic hard disk 841 (or solid state drive) and/or removable media drive 842 may contain one or more data stores and data files used by embodiments of the present disclosure. The data store 840 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 820 may also be employed in a multi-processing arrangement to execute the one or more sequences of instructions contained in system memory 830. In alternative embodiments, hard-wired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments of the invention and for containing data structures, tables, records, or other data described herein. The term "computer readable medium" as used herein refers to any medium that participates in providing instructions to the processors 820 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 841 or removable media drive 842. Non-limiting examples of volatile media include dynamic memory, such as system memory 830. Non-limiting examples of transmission media include coaxial cables, copper wire, and fiber optics, including the wires that make up the system bus 821. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 800 may further include the computer system 810 operating in a networked environment using logical connections to one or more remote computers, such as remote computing device 880. The network interface 870 may enable communication, for example, with other remote devices 880 or systems and/or the storage devices 841, 842 via the network 871. Remote computing device 880 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to system bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computing device 880). The network 871 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

It should be appreciated that the program modules, applications, computer-executable instructions, code, or the like depicted in FIG. 8 as being stored in the system memory 830 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 810, the remote device 880, and/or hosted on other computing device(s) accessible via one or more of the network(s) 871, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 8 may be implemented, at least partially, in hardware and/or firmware across any number of devices.

It should further be appreciated that the computer system 810 may include alternate and/or additional hardware, software, or firmware components beyond those described or depicted without departing from the scope of the disclosure. More particularly, it should be appreciated that software, firmware, or hardware components depicted as forming part of the computer system 810 are merely illustrative and that some components may not be present or additional components may be provided in various embodiments. While various illustrative program modules have been depicted and described as software modules stored in system memory 830, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for operating an autonomous machine in a physical environment, the method comprising:
   detecting an object within the physical environment, the object defining a plurality of regions;
   identifying a task that requires that the autonomous machine interact with the object;
   determining a select region of the plurality of regions of the object that is associated with the task;
   capturing images of the object by sampling camera poses based on requirements of the task, the images defining different views of the object such that the different views of the object are based on the task; and
   based on the different views of the object, generating an object model of the object,
   wherein the object model defines a greater resolution of the select region as compared to the other regions of the plurality of regions.

2. The method of claim 1, wherein capturing images of the object further comprises:
   based on the task, positioning a sensor that captures images of the object or images of the physical environment.

3. The method of claim 1, wherein the physical environment defines a plurality of surfaces, the method further comprising:
   determining a select surface of the plurality of surfaces of the physical environment that is associated with the task; and
   based on the task, capturing images of the physical environment, the images defining different views of the physical environment such that the different views of the physical environment are based on the task.

4. The method of claim 3, the method further comprising:
   based on the views of the select surface, generating an environment model of the physical environment, wherein the environment model defines a greater resolution of the select surface as compared to the other surfaces of the plurality of surfaces.

5. The method of claim 4, the method further comprising:
   based on the environment model, the autonomous machine moving the object along a trajectory that avoids the select surface.

6. The method further of claim 5, the method further comprising:
   the autonomous machine moving the object along the trajectory that avoids the plurality of surfaces such that there no collisions between the object and the plurality of surfaces of the physical environment.

7. The method further of claim 4, the method further comprising:
   providing the different views of the physical environment to a Generative Adversarial Neural Network (GAN); and
   generating, by the GAN, a portion of the environment model, the portion of the environment model defining the surfaces of the plurality of surfaces other than the select surface.

8. The method further of claim 1, wherein capturing images of the object further comprises:
   capturing images of the select region of the object and capturing images of regions other than the select region of the plurality of regions of the object,
   wherein more images are captured of the select region than the other regions of the plurality of regions.

9. The method of claim 1, the method further comprising:
   providing the different views of the object to a Generative Adversarial Neural Network (GAN); and
   generating, by the GAN, a portion of the object model, the portion of the object model including the regions of the plurality of regions other than the select region.

10. An autonomous system, the autonomous system comprising:
    an autonomous machine configured to operate in a physical environment;
    a processor; and
    a memory storing instructions that, when executed by the processor, cause the autonomous system to:
      detect an object within the physical environment, the object defining a plurality of regions;
      identify a task that requires that the autonomous machine interact with the object;
      determine a select region of the plurality of regions of the object that is associated with the task;
      capture images of the object by sampling camera poses based on requirements of the task, the images defining different views of the object such that the different views of the object are based on the task; and
      based on the different views of the object, generating an object model of the object,
      wherein the object model defines a greater resolution of the select region as compared to the other regions of the plurality of regions.

11. The autonomous system of claim 10, the autonomous system further comprising a sensor configured to capture images of objects within the physical environment, and the memory further stores instructions that, when executed by the processor, further cause the autonomous system to:
    based on the task, position the sensor so as to capture particular views of the object or particular views of the physical environment.

12. The autonomous system of claim 10, wherein the physical environment defines a plurality of surfaces, and the instructions further cause the autonomous system to:
    determine a select surface of the plurality of surfaces of the physical environment that is associated with the task; and
    based on the task, capture images of the physical environment, the images defining different views of the physical environment such that the different views of the physical environment are based on the task.

13. The autonomous system of claim 12, wherein the instructions further cause the autonomous system to:
    based on the views of the select surface, generate an environment model of the physical environment, wherein the environment model defines a greater resolution of the select surface as compared to the other surfaces of the plurality of surfaces.

14. The autonomous system of claim 13, wherein the autonomous machine is further configured to:
    based on the environment model, move the object along a trajectory that avoids the select surface.

15. The autonomous system of claim 14, wherein the autonomous machine is further configured to:

move the object along the trajectory that avoids the plurality of surfaces such that there no collisions between the object and the plurality of surfaces of the physical environment.

16. The autonomous system of claim 13, wherein the autonomous system further comprises a Generative Adversarial Neural Network (GAN), and the instructions further cause the autonomous system to provide the different views of the physical environment and the object to the GAN.

17. The autonomous system of claim 16, wherein the GAN is configured to:
generate a portion of the environment model, the portion of the environment model defining the surfaces of the plurality of surfaces other than the select surface.

18. The autonomous system of claim 16, wherein the GAN is configured to:
generate a portion of the object model, the portion of the object model including the regions of the plurality of regions other than the select region.

19. The autonomous system of claim 10, wherein the instructions further cause the autonomous system to:
capture images of the select region of the object and capturing images of regions other than the select region of the plurality of regions of the object,
wherein more images are captured of the select region than the other regions of the plurality of regions.

20. The autonomous system of claim 12, wherein the instructions further cause the autonomous system to:
capture images of the select surface of the physical environment and capturing images of surfaces other than the select surface of the plurality of surfaces of the physical environment,
wherein more images are captured of the select surface than the other surfaces of the plurality of surfaces.

* * * * *